United States Patent
Shin

(10) Patent No.: US 10,445,017 B2
(45) Date of Patent: Oct. 15, 2019

(54) MEMORY SYSTEM AND OPERATING METHOD THEREOF

(71) Applicant: SK hynix Inc., Gyeonggi-do (KR)

(72) Inventor: Beom Ju Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/387,873

(22) Filed: Dec. 22, 2016

(65) Prior Publication Data

US 2018/0024774 A1 Jan. 25, 2018

(30) Foreign Application Priority Data

Jul. 19, 2016 (KR) .................. 10-2016-0091120

(51) Int. Cl.
*G06F 3/06* (2006.01)
*G06F 13/16* (2006.01)
*G06F 13/18* (2006.01)

(52) U.S. Cl.
CPC ............ *G06F 3/0659* (2013.01); *G06F 3/061* (2013.01); *G06F 3/0656* (2013.01); *G06F 3/0679* (2013.01); *G06F 13/1673* (2013.01); *G06F 13/18* (2013.01)

(58) Field of Classification Search
CPC ...... G06F 3/0659; G06F 3/061; G06F 3/0656; G06F 3/0679; G06F 13/1673; G06F 13/18; G06F 3/0658
See application file for complete search history.

(56) References Cited

U.S. PATENT DOCUMENTS

| | | | | |
|---|---|---|---|---|
| 5,497,496 A | * | 3/1996 | Ando | G06F 9/3802 712/206 |
| 6,978,459 B1 | * | 12/2005 | Dennis | G06F 9/52 718/100 |
| 2003/0163629 A1 | * | 8/2003 | Conley | G11C 16/10 711/103 |
| 2004/0041814 A1 | * | 3/2004 | Wyatt | G06F 9/3851 345/556 |
| 2004/0205266 A1 | * | 10/2004 | Regal | H04L 47/10 710/29 |
| 2006/0047874 A1 | * | 3/2006 | Watanabe | G06F 13/1642 710/244 |
| 2006/0106969 A1 | * | 5/2006 | Hoogerbrugge | G06F 13/1631 711/1 |
| 2008/0104283 A1 | * | 5/2008 | Shin | G06F 3/0611 710/6 |
| 2011/0296056 A1 | * | 12/2011 | Choi | G06F 13/4234 710/6 |
| 2011/0321052 A1 | * | 12/2011 | Long | G06F 9/4843 718/103 |

(Continued)

FOREIGN PATENT DOCUMENTS

KR 100332188 4/2002

*Primary Examiner* — Michael Krofcheck
(74) *Attorney, Agent, or Firm* — IP & T Group LLP

(57) ABSTRACT

A memory system includes a memory device including a plurality of command registers; and a memory controller configured to determine whether an empty command register exists among the plurality of command registers, and transmit a new command to the memory device, when an empty command register exists, wherein, when the new command is transmitted from the memory controller, the memory device stores the transmitted new command in the empty command register.

19 Claims, 11 Drawing Sheets

(56) References Cited

U.S. PATENT DOCUMENTS

| | | | |
|---|---|---|---|
| 2014/0068159 A1* | 3/2014 | Yi | G06F 12/0246 |
| | | | 711/103 |
| 2014/0297588 A1* | 10/2014 | Babashetty | G06F 11/1458 |
| | | | 707/613 |
| 2015/0012687 A1* | 1/2015 | Huang | G06F 3/0659 |
| | | | 711/103 |
| 2017/0092379 A1* | 3/2017 | Kim | G06F 3/0613 |
| 2017/0118018 A1* | 4/2017 | Dekker | H04L 9/0897 |
| 2018/0011635 A1* | 1/2018 | Shin | G06F 3/0604 |

* cited by examiner

FIG.2A

| F1 | F2 | F3 | F4 |
|---|---|---|---|
| Pass/fail(n) | Pass/fail(n-1) | Command state(n) | Command state(n-1) |
| 0: pass<br>1: fail | 0: pass<br>1: fail | 0: completion<br>1: pending<br>2: executing | 0: completion<br>1: pending<br>2: executing |

| Tag | Pass/fail | Command state |
|---|---|---|
| 0 | 0: pass<br>1: fail | 0: completion<br>1: pending<br>2: executing |
| 1 | 0: pass<br>1: fail | 0: completion<br>1: pending<br>2: executing |

190a

190b

| Register value | Suspend condition |
|---|---|
| 0 | Not perform suspend |
| 1 | Suspend erase execution & execute read command first |
| 2 | Suspend erase execution & execute write command first |
| 3 | Suspend erase execution & execute read or write command first |
| 4 | Suspend write execution & execute read command first |
| 5 | Suspend write or erase execution & execute read command first |

MEMORY SYSTEM AND OPERATING METHOD THEREOF

CROSS-REFERENCES TO RELATED APPLICATION

The present application claims priority under 35 § 119(a) to Korean application number 10-2016-0091120, filed on Jul. 19, 2016, in the Korean Intellectual Property Office, which is incorporated herein by reference in its entirety.

BACKGROUND

1. Technical Field

Various embodiments generally relate to a semiconductor device, and, more particularly, to a memory system and an operating method thereof.

2. Related Art

A semiconductor memory device is memory device which is realized using a semiconductor such as silicon (Si), germanium (Ge), gallium arsenide (GaAs) and indium phosphide (InP). A semiconductor memory device is generally classified into a volatile memory device and a nonvolatile memory device.

A volatile memory device is a memory device which loses stored data when power supply is interrupted. Examples of a volatile memory device include an SRAM (static RAM), a DRAM (dynamic RAM) and an SDRAM (synchronous DRAM). A nonvolatile memory device is a memory device which retains stored data even when power supply is interrupted. A nonvolatile memory device includes a ROM (read only memory), a PROM (programmable ROM), an EPROM (electrically programmable ROM), an EEPROM (electrically erasable and programmable ROM), a flash memory, a PRAM (phase change RAM), an MRAM (magnetic RAM), an RRAM (resistive RAM), and an FRAM (ferroelectric RAM). A flash memory is generally classified into a NOR flash and a NAND flash.

SUMMARY

Various embodiments are directed to a memory system having a simplified interface between a controller and a memory device, and an operating method thereof. The memory system may significantly improve the performance of the memory device.

In an embodiment, a memory system may include: memory device including a plurality of command registers; and a memory controller configured to determine whether an empty command register exists among the plurality of command registers, and transmit a new command to the memory device, when an empty command register exists, wherein, when the new command is transmitted from the memory controller, the memory device stores the transmitted new command in the empty command register.

In an embodiment, a memory system may include: a memory device; and a memory controller configured to control an operation of the memory device, the memory device including: plural command registers configured to store commands transmitted from the memory controller; a command state register configured to store state informations of the commands stored in the command registers; and a control logic configured to store the transmitted command in an empty one of the command registers, wherein the memory controller determines by checking the command state register whether an empty command register exists among the command registers, and transmits a new command to the memory device when the empty command register exists.

In an embodiment, a method for operating a memory system including a memory device which includes a plurality of command registers and a memory controller which controls an operation of the memory device may include: determining whether an empty command register exists among the plurality of command registers; transmitting a new command to the memory device, when an empty command register exists; and storing the transmitted command in the empty command register.

In an embodiment, a memory system may include: memory device including a plurality of command registers for storing provided commands, and suitable for executing the stored commands; and a memory controller suitable for controlling the memory device by providing the commands to the memory device, wherein a memory controller provides a new command to the memory device when one or more among the stored commands are execution-completed, and wherein the memory device stores the new command in one among the command registers corresponding to the execution-completed commands.

The memory device further includes a command state register for storing execution statuses of the stored commands, and the memory device updates the execution statuses at least when one or more of the stored commands are execution-completed.

The memory controller determine whether to provide the new command according to the execution statuses.

The memory device executes the stored command in order of priority.

The memory device suspends a command in the process of being executed and having a lower priority, and executes another command having a higher priority, among the stored commands.

In an embodiment, a method for operating a memory system including a memory device and a memory controller may include: providing, by the memory controller, commands to the memory device; storing, by the memory device, the provided commands in command registers of the memory device; and executing, by the memory device, the stored commands, wherein a new command is provided to the memory device when one or more among the stored commands are execution-completed, and wherein the new command is stored in one among the command registers corresponding to the execution-completed commands.

The method further include: storing execution statuses of the stored commands; and updating the execution statuses at least when one or more of the stored commands are execution-completed.

The providing of the commands includes determining, by the memory controller, whether to provide the new command according to the execution statuses.

The stored commands are executed in order of priority.

The executing of the stored commands includes suspending, by the memory device, a command in the process of being executed and having a lower priority among the stored commands, and executing, by the memory device, another command having a higher priority among the stored commands.

According to the embodiments, two commands may be stored in a memory device, and thus when execution of a first command is completed, a second command may be executed immediately. Accordingly, a memory controller does not need to transmit a separate cache command to the memory device, and thus the number of commands may be decreased thereby simplifying an interface.

According to the embodiments, even when it is in a busy state, the memory device may receive a command thereby shortening a command reception interval, and thus the performance of a memory system may be improved.

According to the embodiments, the memory device may suspend and resume execution of a command by itself, and thus the memory controller does not need to transmit a separate suspend/resume command to the memory device thereby reducing the number of command transmissions.

BRIEF DESCRIPTION OF THE DRAWINGS

The above and other features and advantages of the present invention will become more apparent to those skilled in the art to which the present invention belongs by describing in detail various embodiments thereof with reference to the attached drawings in which:

FIGS. 2A and 2B are diagrams illustrating representations of examples of command state registers, in accordance with embodiments of the present invention.

DETAILED DESCRIPTION

Figure 1:
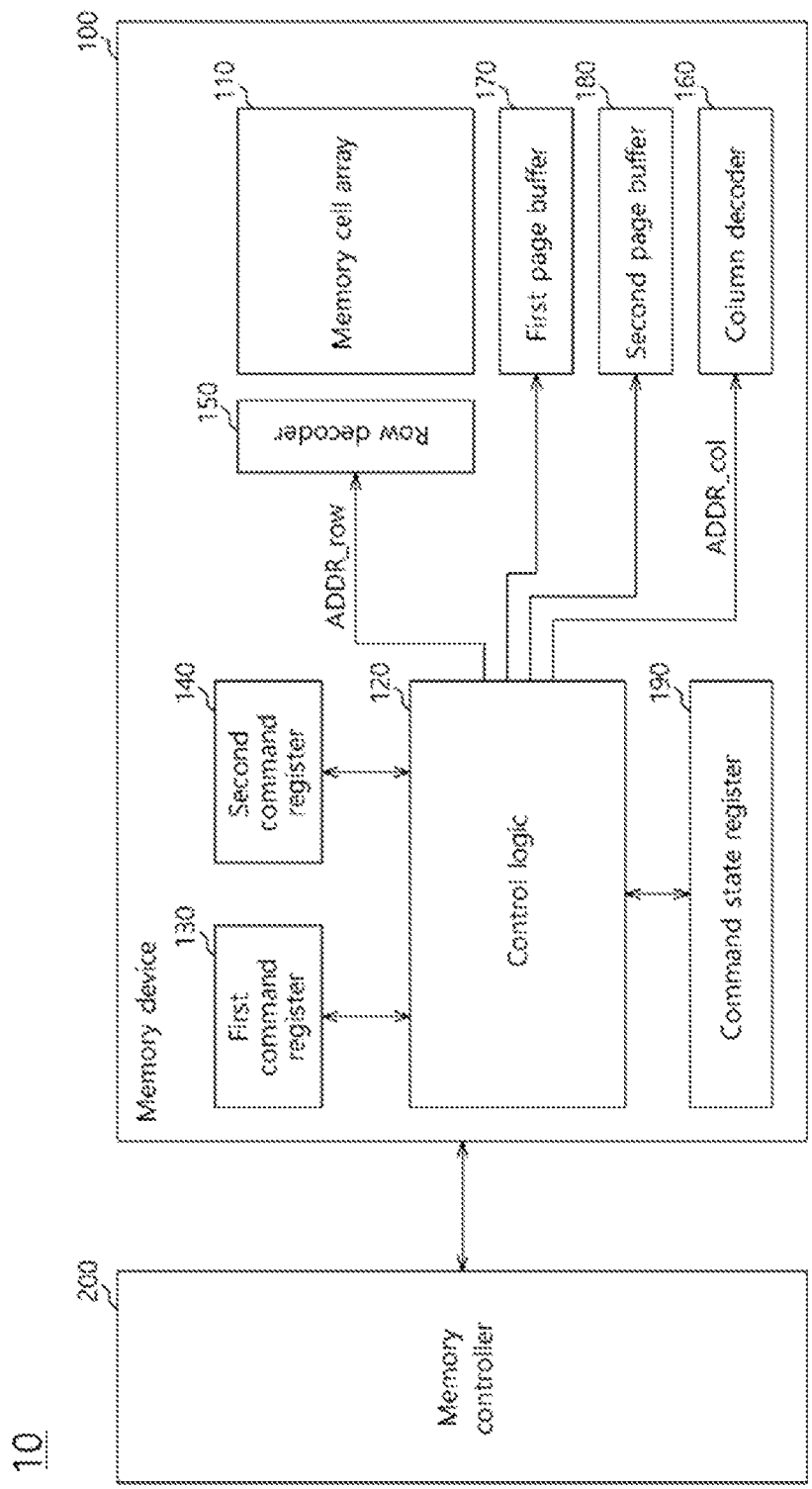
FIG. 1 is a block diagram illustrating a memory system, in accordance with an embodiment of the present invention.

Hereinafter, a memory system and an operating method thereof will be described below with reference to the accompanying drawings through various examples of embodiments.

The present disclosure, however, may be embodied various different forms, and should not be construed as being limited to the illustrated embodiments herein. Rather, these embodiments are provided as examples so that this disclosure will be thorough and complete, and will fully convey the various aspects and features of the present invention to those skilled in the art.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to more clearly illustrate the various elements of the embodiments. For example, in the drawings, the size of elements and the intervals between elements may be exaggerated compared to actual sizes and intervals for convenience of illustration.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element (also referred to as a feature) described in connection with one embodiment may be used singly or in combination with other elements of another embodiment, unless specifically indicated otherwise.

Hereinafter, the various embodiments of the present invention will be described in detail with reference to the attached drawings.

Referring now to FIG. 1 a memory system 10 is provided, in accordance with an embodiment of the present invention. T the memory system 10 may include a memory device 100 and a memory controller 200.

The memory system 10 may store data which may be accessed by a host device. The host device may be a portable electronic device such as a mobile phone, an MP3 player, a laptop computer, a desktop computer, or a non-portable electronic device such as, a game player, a TV, an in-vehicle infotainment system.

The memory system 10 may be manufactured as any one of various storage devices according to the protocol of an interface which is electrically coupled with the host device. For example, the memory system 10 may be configured as at least one of various storage devices such as a solid state drive, a multimedia card in the form of an MMC, an eMMC, an RS-MMC and a micro-MMC, a secure digital card in the form of an SD, a mini-SD and a micro-SD, universal serial bus (USB) storage device, a universal flash storage (UFS) device, a Personal Computer Memory Card International Association (PCMCIA) card type storage device, a peripheral component interconnection (PCI) card type storage device, a PCI express (PCI-E) card type storage device, a compact flash (CF) card, a smart media card, a memory stick, and the like.

The memory system 10 may be manufactured as any one among various package types such as a package-on-package (PoP), a system-in-package (SIP), a system-on-chip (SoC), a multi-chip package (MCP), a chip-on-board (CoB), a wafer-level fabricated package (WFP) and a wafer-level stack package (WSP) and the like.

The memory device 100 may operate as the storage medium of the memory system 10. The memory device 100 may be configured by at least one of various nonvolatile memory devices such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PRAM) using a chalcogenide alloy, a resistive random access memory (RERAM) using a transition metal compound, according to memory cells, and the like.

The memory device 100 may include a memory cell array 110, a control logic 120, a first command register 130, a second command register 140, a row decoder 150, a column decoder 160, a first page buffer 170, a second page buffer 180 and a command state register 190 operatively coupled through at least one internal bus.

The memory cell array 110 may include a plurality of memory cells (not shown). The memory cells may be respectively disposed at regions where a plurality of bit lines (not shown) and a plurality of word lines (not shown) intersect with each other. A memory cell may be a single level cell (SLC) storing one bit, or a multi-level cell (MLC) capable of storing 2-bit data, 3-bit data (a triple level cell (TLC)), or 4-bit data (a quad level cell (QLC)). The memory cell array 110 may include a plurality of memory cells selected from the group consisting of single level cells, 2-bit level cells, triple level cells, and quad level cells. In an embodiment, the memory cells may be hybrid cells, i.e., a combination of at least two of single level cells, 2-bit level cells, triple level cells, and quad level cells. In an embodiment, the memory cell array 110 may include memory cells arranged in a 2-dimensional horizontal structure. In yet another embodiment the memory cell array 110 may include memory cells arranged in a 3-dimensional vertical structure. Such structures are well known in the art and therefore we will not describe them any further for the sake of not obfuscating the description of the present invention with unnecessary well known details.

The control logic 120 may control one or more operations of the memory device 100 including write, read and erase operations of the memory device 100. For example, the control logic 120 may control a write operation and a read operation to be performed in the memory cell array 110, in response to a write command and a read command, respectively. The write and read commands may be transmitted to the memory device 100 from the memory controller 200. The write and read commands may be generated by the memory controller 200 in response to respective write and read requests received from a host (not shown) operatively coupled to the memory system 100. Also, the control logic 120 may control an erase operation to be performed in the memory cell array 110, in response to an erase command transmitted from the memory controller 200. As an example, a write operation and a read operation may be performed by the unit of a page, whereas an erase operation may be performed by the unit of a block. The memory cell array 110 may include a plurality of blocks, and each block may include a plurality of pages.

The control logic 120 may transmit a row address ADDR_row for selecting a word line and a column address ADDR_col for selecting a bit line, to the row decoder 150 and the column decoder 160, respectively, based on an address provided from the memory controller 200.

Each of the first and second command registers 130 and 140 may store a command transmitted from the memory controller 200. The commands stored in the first and second command registers 130 and 140 may be fetched and executed by the control logic 120 in a sequence in which the commands are transmitted from the memory controller 200.

The row decoder 150 may select any one among a plurality of word lines coupled with the memory cell array 110. For example, the row decoder 150 may receive the row address ADDR_row from the control logic 120. The row decoder 150 may select any one word line corresponding to the received row address ADDR_row, among the plurality of word lines.

The column decoder 160 may select any one among a plurality of bit lines coupled with the memory cell array 110. For example, the column decoder 160 may receive the column address ADDR_col from the control logic 120. The column decoder 160 may select any one bit line corresponding to the received column address ADDR_col, among the plurality of bit lines.

The first and second page buffers 170 and 180 may be coupled with the memory cell array 110 through the plurality of bit lines. The first page buffer 170 may temporarily store data including a command stored in the first command register 130. The second page buffer 180 may temporarily store data including a command stored in the second command register 140.

For example, if commands stored in the first and second command registers 130 and 140 are write commands, the first and second page buffers 170 and 180 may temporarily store write data provided from the memory controller 200 which are to be stored in the memory cell array. If commands stored in the first and second command registers 130 and 140 are read commands, the first and second page buffers 170 and 180 may temporarily store data read out from the memory cell array 110 corresponding to the read commands.

The command state register 190 may store at least one state information for the commands stored in the first and second command registers 130 and 140. A state information may include an execution result information indicating whether or not a command has been successfully executed. A state information may include an execution state information indicating whether execution of the command is completed, or is pending (hasn't started) or whether the command is in the process of being executed.

FIGS. 2A and 2B are diagrams illustrating representations of examples of the command state register 190.

Referring to FIG. 2A, the command state register 190 may include a plurality of fields (e.g., first to fourth fields F1 to F4). The first field F1 ("Pass/fail(n)" in FIG. 2A) may represent execution result information of an n^th command, i.e. information indicating whether a command has been successfully executed ("Pass") or has failed ("fail"). The second field F2 ("Pass/fail(n−1)" in FIG. 2A) may represent execution result information of an (n−1)^th command. The third field F3 ("command state(n)" in FIG. 2A) may represent execution state information of the n^th command such as, whether the command has been completed ("completion"), whether the command is pending ("pending"), and whether the command is currently in the process of being executed ("executing"). The fourth field F4 ("Command state(n−1)" in FIG. 2A) may represent execution state information of the (n−1)^th command. Here, may be an integer equal to or greater than 1. The (n−1)^th command may be a command which is transmitted earlier than the n^th command from the memory controller 200. The arrangement sequence of the respective fields of the command state register 190 is not limited to the one shown in FIG. 2A, and may be changed according to design.

The respective execution state information of the third and fourth fields F3 and F4 may have 3 values (e.g., 0, 1 and 2) respectively indicating a corresponding command as execution-completed ("0: completion" in FIG. 2A), execution-pending ("1: pending" in FIG. 2A), and of in the process of being executed ("2: executing" in FIG. 2A). The execution-pending command may be stored in one of the first and second command registers 130 and 140, and may not be fetched yet. The on-the-execution command has been fetched and is in the process of being executed by the control logic 120. The on-the-execution command may be suspended by the control logic 120 while it is executed.

For example, as shown in FIG. 2A, if '1' is stored in the third field F3 and '2' is stored in the fourth field F4, the memory controller 200 determines, by checking the command state register 190, that the state of the (n−1)^th command is being executed and the state of the n^th command is execution-pending. If '2' is stored in both of the third and fourth fields F3 F4, the memory controller 200 determines that the (n−1)^th command is suspended during the execution and the n^th command is currently executed. Generally, the memory device 100 may process only one command at any one time. Accordingly, the fact that two commands, i.e., both the (n−1)^th command and the n^th command are being executed may mean that one command of the two commands was suspended during execution. At this time, since a command transmitted earlier is executed first, the memory controller 200 may determine that the (n−1)^th command is suspended and the n^th command is currently executed.

The execution result information of the first and second fields F1 and F2 may have 2 values, e.g., 0 and 1 respectively indicating execution-pass and execution-fail (respectively "0: pass" and "1: fail" in FIG. 2A) of a corresponding command. The execution result information of a command may be updated by the control logic 120 after execution of the command is completed. For example, as shown in FIG. 2A, if '0' is stored in the fourth field F4 and '0' is stored in the second field F2, the memory controller 200 determines that the execution of the (n−1)^th command has been completed and the execution result of the (n−1)^th command is a pass, hence the memory controller 200 determines that the (n−1)^th command has been executed successfully.

In the command state register 190 according to the present embodiment, values of the respective fields F1 to F4 may be updated each time the execution status of a corresponding command changes or each time the memory controller 200 provides a new command.$_{[ipntlaw1]}$ $_{[ipntlaw2]}$For example, if the (n−1)^th command is execution-completed, values of the second and fourth fields F2 and F4 for the execution-completed (n−1)^th command is erased from the command register 190, and the execution result information of the first field F1 and the execution state information of the fourth field F3 for the n^th command may be respectively updated to be moved to the second field F2 and the fourth field F4, and the n^th command is now regarded as the (n−1)^th command. If there is an (n+1)^th command transmitted from the memory controller 200, the execution result information and an execution state information on the (n+1)^th command may be stored in the first: and third fields F1 and F3, respectively, and will be treated as the n^th command.

If execution of the (n−1)^th command is completed, the (n−1)^th command is erased from a command register in which the (n−1)^th command is stored, and the corresponding command register may become an empty state.

The memory controller 200 may determine whether to transmit a command to the memory device 100, by checking the execution state informations of commands stored in the command state register 190. For example, the memory controller 200 may check the command state register 190, may determine, when execution of a certain command is completed, that one of two command registers, that is, the first command register 134 and the second command register 140, is empty, and may transmit a command to execute next, to the memory device 100. If it is determined that two commands correspond to executing or pending, the memory controller 200 may determine that no empty command register exits between the first command register 130 and the second command register 140, and may not transmit a command to execute next, to the memory device 100.$_{[ipntlaw3]}$ In another embodiment, referring to FIG. 2B, the command state register 190 may include first and second command state registers 190a and 190b. Each of the first and second command state registers 190a and 190b may include an execution result information field ("Pass/fail" in FIG. 26) and an execution state information field ("Command state" in FIG. 2B) for a command. Also, each of the first and second command state registers 190a and 190b may include a tag information field ("Tag" in FIG. 2B). The execution result information and the execution state information of a command are described above with reference to FIG. 2A.

When the memory controller 200 transmits a command to the memory device 100, it may transmit together with the command a tag information. The tag information may indicate a command state register among a plurality of command state registers in which the state information relating to the received command is to be stored. Hence, when the memory device 100 stores state information for the received command, it stores the state information in the command state register which is designated by the tag information which was transmitted together with the command.

For example as shown in the example of FIG. 26, the tag information of the first command state register 190a of the command state register 190 is set as '0' and the tag information of the second command state register 190b of the command state register 190 is set as '1.' So for example, if the memory controller 200 transmits a command and a tag information of '0' to the memory device 100, the memory device 100 may store state information for the command, in the first command state register 190a for which the tag information is set as '0.'

If a state information request for the commands is received from the memory controller 200, the memory device 100 may transmit the state informations of the respective commands and tag informations corresponding to the respective commands to the memory controller 200. The memory controller 200 may check the tag informations, and determine execution states of the commands corresponding to the tag informations.

The control logic 120 may store a command transmitted from the memory controller 200, in the first command register 130 or the second command register 140. When transmitting a command to the memory device 100, the memory controller 200 may not designate whether the command is to be stored in the first command register 130 or the second command register 140.

The memory controller 200 checks the command state register 190, and transmits a command to the memory device 100 only when an empty command register exists, i.e., only when a command register having the execution state information field value of '0' representing the execution-completion of corresponding command.

The control logic 120 of the memory device 100 may store the command transmitted from the memory controller 200, in an empty command register between the first and second command registers 130 and 140.

FIGS. 3A to 3D illustrate the control logic 120 storing commands transmitted from the memory controller 200 into the command registers 130 and 140, and fetching the stored commands. For the sake of convenience in explanation, it is assumed that both the first and second command registers 130 and 140 are initially empty, i.e., there is initially no command that is execution-pending or in the process of being executed.

Figure 3A:
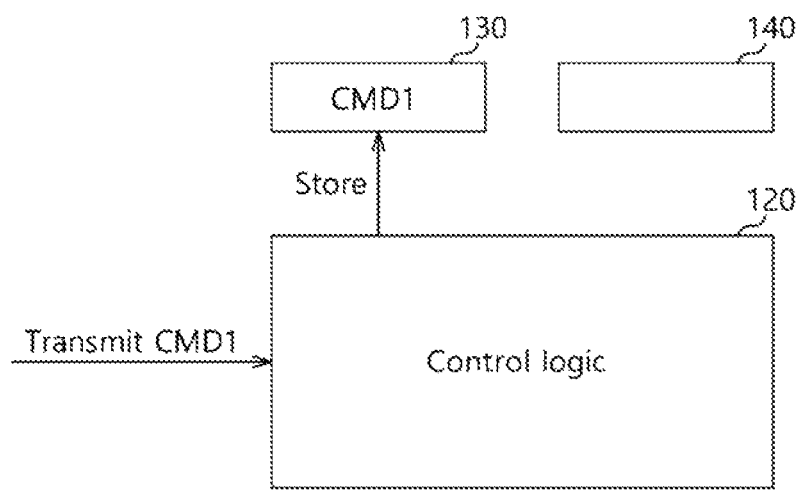
FIGS. 3A to 3D are representations of examples of diagrams to assist in the explanation of operations for a memory device of FIG. 1.

Referring to FIG. 3A, if a first command CMD1 is transmitted from the memory controller 200, the control logic 120 may store the transmitted first command CMD1 in the first command register 130. While it is illustrated in the present embodiment that the control logic 120 stores the first command CMD1 in the first command register 130, it is to be noted that this simply an example. For instance, alternatively, the control logic 120 may store the first command CMD1 in the second command register 140.

Figure 3B:
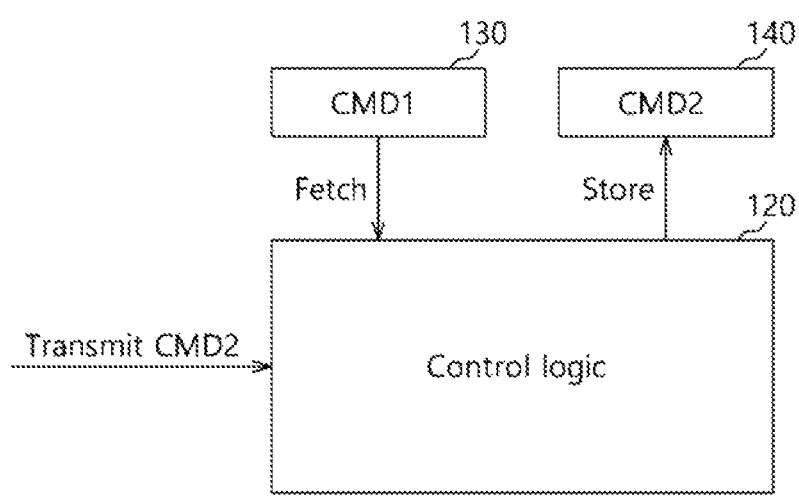

Referring to FIG. 3B, if, thereafter, a second command CMD2 is transmitted from the memory controller 200 while the first command CMD1 is execution-pending or in the process of being executed, the control logic 120 may store the transmitted second command CMD2 in the second command register 140 which is empty. In this way, if there is no empty command register as both of the first and second commands CMD1 and CMD2 of the first and second command registers 130 and 140 are execution-pending or in the process of being executed, the memory controller 200 may not transmit another command any more to the memory device 100, by checking the execution state information of the command register 190.

Also, as shown in FIG. 3B, the control logic 120 may fetch the first command CMD1 from the first command register 130, and execute the fetched first command CMD1.

Figure 3C:
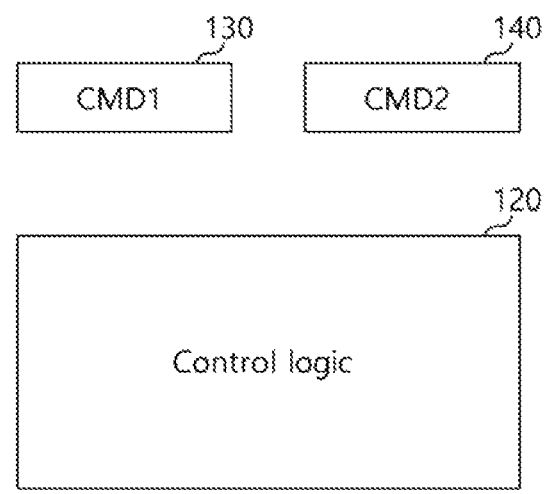

Referring to FIG. 3C, even though the first command CMD1 is fetched by the control logic 120, the first command CMD1 is still stored in the first command register 130. Namely, the first command register 130 may not be at an empty state until execution of the fetched first command CMD1 is completed. When execution of the fetched first command CMD1 is completed, then the first command register 130 transitions to an empty state. In this way, since the first command CMD1 is in the process of being executed and the second command CMD2 is execution-pending, the memory controller 200 does not transmit a new command to the memory device 100, by checking the execution state information of the command register 190.

Figure 3D:
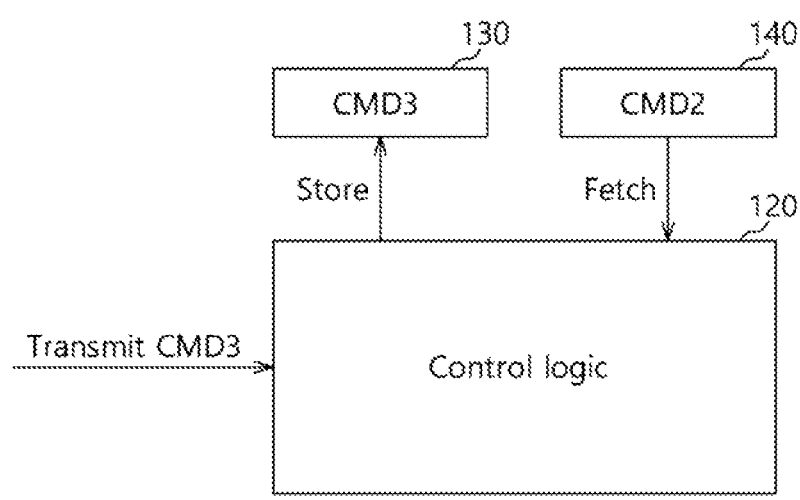

When execution of the first command CMD1 is completed the first command register 130 transitions to an empty state, and then the memory controller 200 can transmit a third command CMD3 to the memory device 100. The control logic 120 then stores the transmitted third command CMD3 in the first command register 130 which is currently empty, as shown in FIG. 3D. The control logic 120 may then fetch the second command CMD2 from the second command register 140, and execute the fetched second command CMD2. When execution of the fetched second command CMD2 is completed, the control logic 120 may fetch the third command CMD3 from the first command register 130, and execute the fetched third command CMD3. Meanwhile, when at least one of the first and second command registers becomes empty then the memory controller 200 can transmit a new command to the memory device which can be stored in the at least one empty first or second command register.

Meanwhile, when the memory controller 200 transmits a write command to the memory device 100, it may also transmit write data together with the write command. The control logic 120 may store the write data in a page buffer corresponding to a command register in which the write command is stored. For example, in the case where the first command CMD1 is a write command, the control logic 120 may store the first command CMD1 in the first command register 130, and may store write data for the first command CMD1 in the first page buffer 170 corresponding to the first command register 130.

If a read command is transmitted from the memory controller 200, the control logic 120 in response to the transmitted read command may store data read out from the memory cell array 110 in a page buffer corresponding to a command register in which the read command is stored. For example, if the second command CMD2 transmitted from the memory controller 200 is a read command, the control logic 120 may store data, which is read out from the memory cell array 110 by execution of the second command CMD2, in the second page buffer 180 corresponding to the second command register 140.

If a newly transmitted command which is stored in the first or the second command register 130 or 140 has a higher priority than a command which is in the process of being executed, the control logic 120 may suspend the command which is in the process of being executed and execute the newly transmitted command that has higher priority. For example, the control logic 120 may determine whether or not the priority of a newly transmitted command from the memory controller 200 is higher than a command currently in the process of being executed. If the priority of the transmitted command is higher, the control logic 120 may then immediately suspend the command currently in the process of being executed, and execute the newly transmitted command having the higher priority. The control logic 120 may periodically check whether or not a command of a higher priority exists in the first and second command registers 130 and 140. If a command of a higher priority is detected, the control logic 120 may suspend a command in the process of being executed and having a lower priority and execute the command of the higher priority. If execution of the command of the higher priority is completed, the control logic 120 may then resume the execution of the suspended command.

In this way, since the memory device 100 may execute first a command of a higher priority by suspending a command currently in the process of being executed and having a lower priority and then resume the execution of the suspended command, the memory controller 200 does not need to transmit a separate suspend/resume command to the memory device 100.

Before suspending a command which is in the process of being executed, the control logic 120 may determine whether the suspend count$_{[ipnt5]}$ of the command which is in the process of being executed exceeds a predetermined suspend count. The suspend count refers to the number of times the command has been suspended. Only when the suspend count is equal to or smaller than the predetermined suspend count, the control logic 120 may suspend the command in the process of being executed and execute first a command of a higher priority.

The control logic 120 may update state informations for the commands stored in the command state register 190. The control logic 120 may update execution state informations and execution result informations for commands stored in the first and second command registers 130 and 140, respectively.

The memory controller 200 may transmit to the memory device 100 a command, an address, control signals and so forth corresponding to a request from an external device. By referring to the command state register 190 of the memory device 100, if the execution state information represents a certain command as execution-completed, the memory controller 200 may determine that there is an empty command register, and transmit a new command to the memory device 100. Also, by referring to the command state register 190 of the memory device 100, if the execution state) 5 informations of all commands correspond to pending or executing, the memory controller 200 may determine that there is no empty command register, and not transmit a new command, to the memory device 100.

In accordance with an embodiment of the present disclosure, the memory device 100 includes a plurality of command registers (i.e., the first and second command registers 130 and 140), and thus the memory controller 200 may transmit a new command to the memory device 100 when at least one of the plurality of the command registers have space for the new command even while the memory device 100 is busy in currently executing the command in a command register among the plurality of the command registers. In this way, since the memory device 100 may receive a new command even when it is in a busy state, a command reception interval may be shortened and thus the performance of the memory system 10 may be improved.

Moreover, since the memory device 100 may store plural commands, it may execute the stored plural commands without a halt, and thus the memory controller 200 may not need to transmit a separate cache command to the memory device 100 thereby reducing the number of commands and thus reducing the load of the interface between the controller and the memory devices or stated more simply simplifying the interface.

Figure 4:
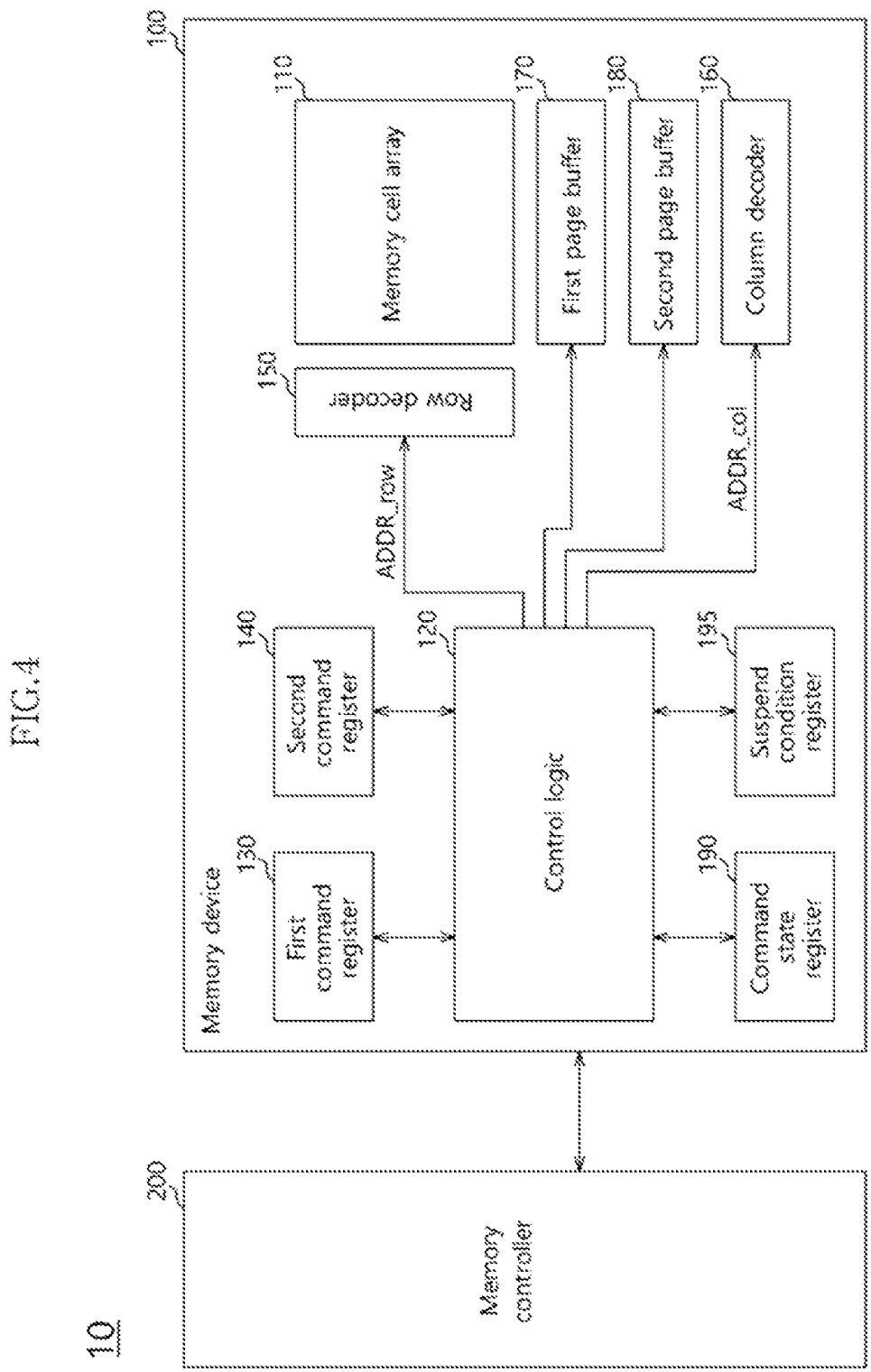
FIG. 4 is a block diagram illustrating a memory system, in accordance with another embodiment of the present invention.

FIG. 4 is a block diagram illustrating a memory system 10 in accordance with another embodiment of the present invention.

Referring to FIG. 4, the memory system 10 of FIG. 4 may be the same as the memory system of FIGS. 1 to 4 except that unlike the embodiment of FIG. 1, the memory system of FIG. 4 includes a suspend condition register 195.

The suspend condition register 195 may store a setting information for a condition in which the memory device 100 performs a suspend operation. The register value of the suspend condition register 195 may be set by the memory controller 200. For example, the memory controller 200 may set the register value of the suspend condition register 195 when the memory device 100 is in a ready state. The control logic 120 of the memory device 100 may perform the suspend operation only under a corresponding condition, by referring to the register value set in the suspend condition register 195.

Figures 5, 6:
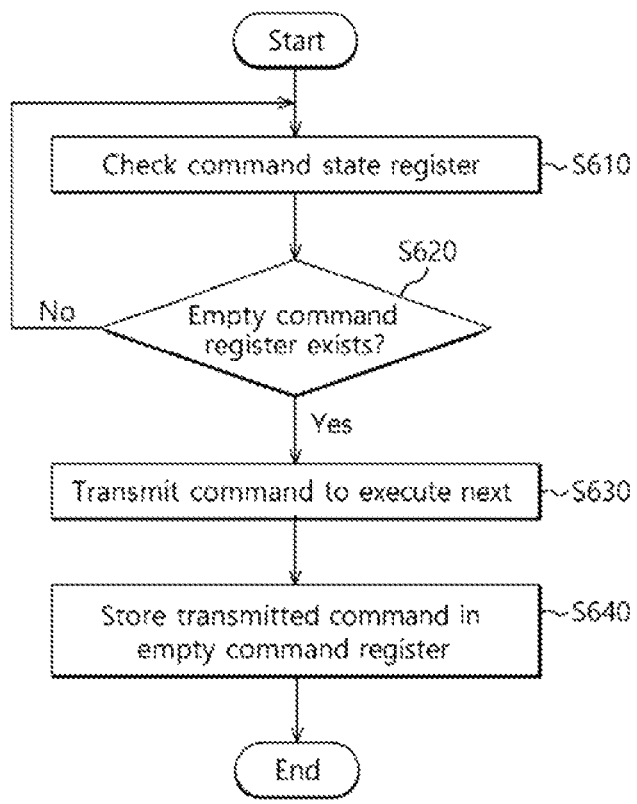
FIG. 5 is a diagram illustrating register values for suspending conditions, in accordance with an embodiment of the present invention.
FIG. 6 is a flow chart of a method for operating a memory system, in accordance with an embodiment of the present invention.

FIG. 5 is a diagram illustrating suspend condition register values and suspend conditions corresponding to the respective register values in accordance with an embodiment of the present invention.

Referring to FIG. 5, the suspend condition register 195 may store one among a plurality of register values. While FIG. 5 illustrates register values from '0' to '5' and suspend conditions for the respective register values, it is to be noted that this is for an illustration purpose only and the embodiment is not specifically limited thereto.

For example, the memory controller 200 may set one of the values '0' to '5' as the register value of the suspend condition register 195. The control logic 120 may check the register value set in the suspend condition register 195, and perform a suspend operation under a corresponding suspend condition.

For example, referring to the example of FIG. 5, if the register value stored in the suspend condition register 195 is "0," the control logic 120 does not perform the suspend operation in any case. If the register value stored in the suspend condition register 195 is '1,' the control logic 120 suspends erase execution and executes first a transmitted read command under a condition where the read command is transmitted during erase execution, and does not perform the suspend operation under the other conditions.

Similarly, if the register value stored in the suspend condition register 195 is '2,' the control logic 120 suspends erase execution and executes first a transmitted write command under a condition where the write command is transmitted during an erase execution, and does not perform the suspend operation under the other conditions. If the register value stored in the suspend condition register 195 is '3,' the control logic 120 suspends erase execution and executes first a transmitted read command or write command under a condition where the read command or write command is transmitted during an erase execution, and does not perform the suspend operation under the other conditions.

If the register value stored in the suspend condition register 195 is '4,' the control logic 120 suspends write execution and executes first a transmitted read command under a condition where the read command is transmitted during write execution, and does not perform the suspend operation under the other conditions. If the register value stored in the suspend condition register 195 is '5,' the control logic 120 suspends write or erase execution and executes first a transmitted read command under a condition where the read command is transmitted during a write or an erase execution, and does not perform the suspend operation under the other conditions.

In other words, the control logic 120 of the memory device 100 may perform the suspend operation only under a corresponding condition by referring to a suspend condition register value set in advance by the memory controller 200.

FIG. 6 is a flow chart of a method for operating the memory system 10, according to an embodiment of the present invention. FIG. 1.

At step S610, the memory controller 200 may check whether the execution-completed command is included in the first and second command registers 130 and 140 by referring to the command state register 190.

[ipntlaw6]If execution of a east one of the commands stored in the first and second command registers 130 and 140 is completed, then at least one of the first and second command registers 130 and 140 of the execution-completed command becomes empty.

At step S620, the memory controller 200 may determine whether at least one of the first and second command registers 130 and 140 is empty (i.e., a corresponding command is execution-completed) based in the process of being executed state informations of the commands stored in the command state register 190.[ipntlaw7]

Steps S610 and S620 may be repeated until at least one of the first and second command registers 130 and 140 is determined as empty (i.e., a corresponding command is execution-completed).[ipntlaw8].

When at least one of the first and second command registers 130 and 140 is determined as empty (i.e., a corresponding command is execution-completed) at step S620, the memory controller 200 may transmit a new command to the memory device 100 at step S630.

At step S640, the memory device 100 may store the command transmitted from the memory controller 200 in the empty command register. In the case where both the first and second command registers 130 and 140 are determined as empty, the memory device 100 may store the transmitted command in either one of the first and second command registers 130 and 140.

Figure 7:
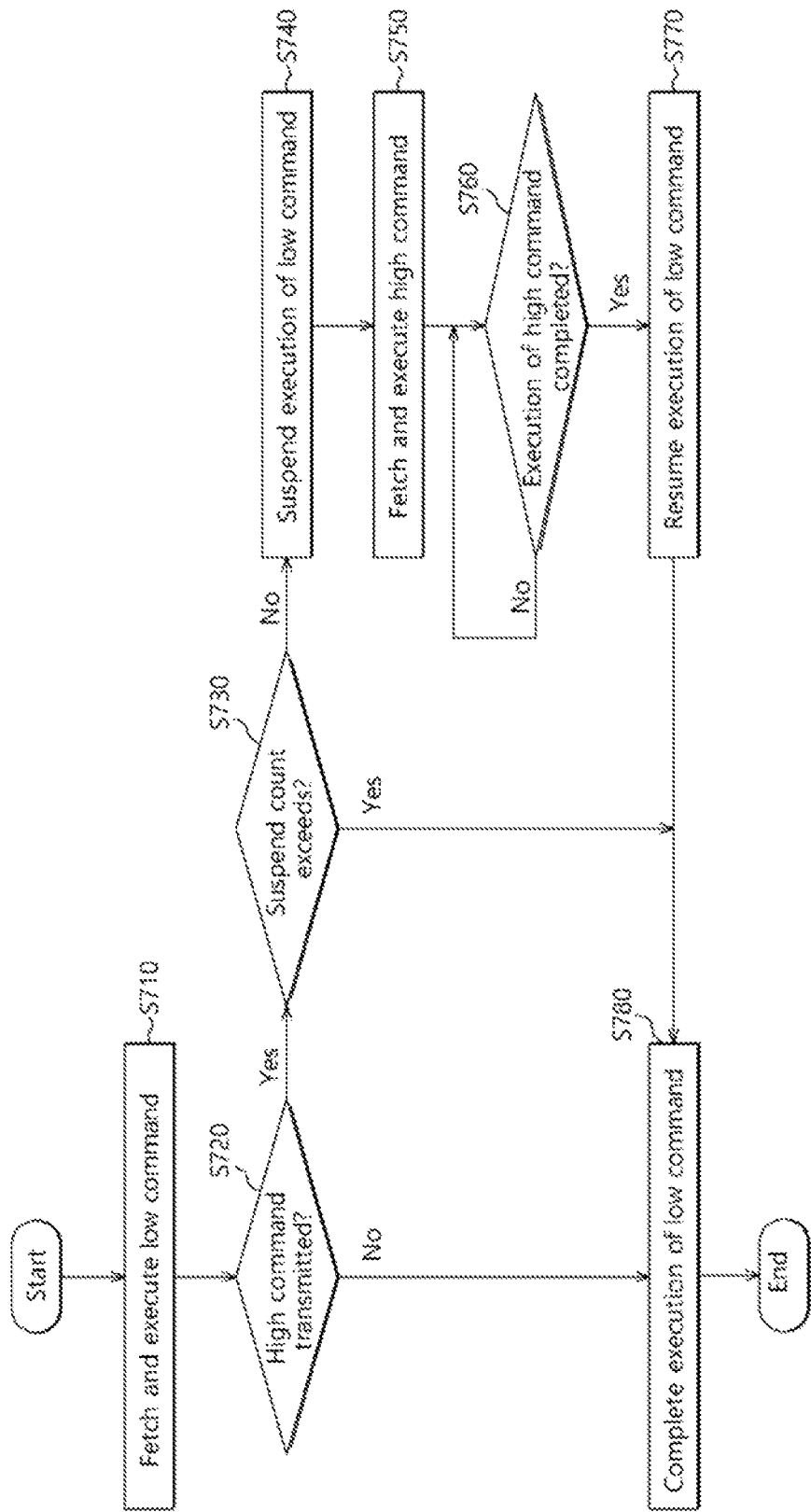
FIG. 7 is a flow chart of a method for performing a suspending operation of a memory device, in accordance with an embodiment of the present invention.

FIG. 7 is a flow chart of a method for performing the suspend operation of the memory device 100 according to an embodiment of the present invention. For the sake of convenience in explanation, a command having a lower priority will be referred to as a low command and a command having a higher priority will be referred to as a high command. It is assumed that a low command is stored in the first command register 130 of the memory device 100.

At step S710, the control logic 120 of the memory device 100 may fetch the low command from the first command register 130, and execute the fetched low command.

At step S720, if a new command is transmitted from the memory controller 200, the control logic 120 may store the transmitted command in the second command register 140, and may determine whether the transmitted command is a high command.

When the transmitted command is determined as a high command, the control logic 120 may determine whether the suspend count of the low command currently in the process of being executed exceeds a predetermined suspend count PSC[ipnt9] at step S730. When the suspend count of the low command currently in the process of being executed is determined as equal to or smaller than the predetermined suspend count, the control logic 120 may suspend operation to the low command currently in the process of being executed at step S740. At this time, the control logic 120 may back up a register value necessary for execution of the low command and data.

At step S750, the control logic 120 may fetch the high command from the second command register 140, and execute the fetched high command.

At step S760, the control logic 120 may determine whether execution of the high command is completed. As a result of determination, if execution of the high command is completed, step S770 may be performed.

At the step S770, the control logic 120 may resume execution of the low command currently suspended, and the control logic 120 may complete execution of the low command at the step S780.

When the transmitted command is not determined as a high command at step S720 or the suspend count of the low command currently in the process of being executed is not determined as equal to or smaller than the predetermined suspend count at step S730, the control logic 120 may complete execution of the low command at the step S780.

Figure 8:
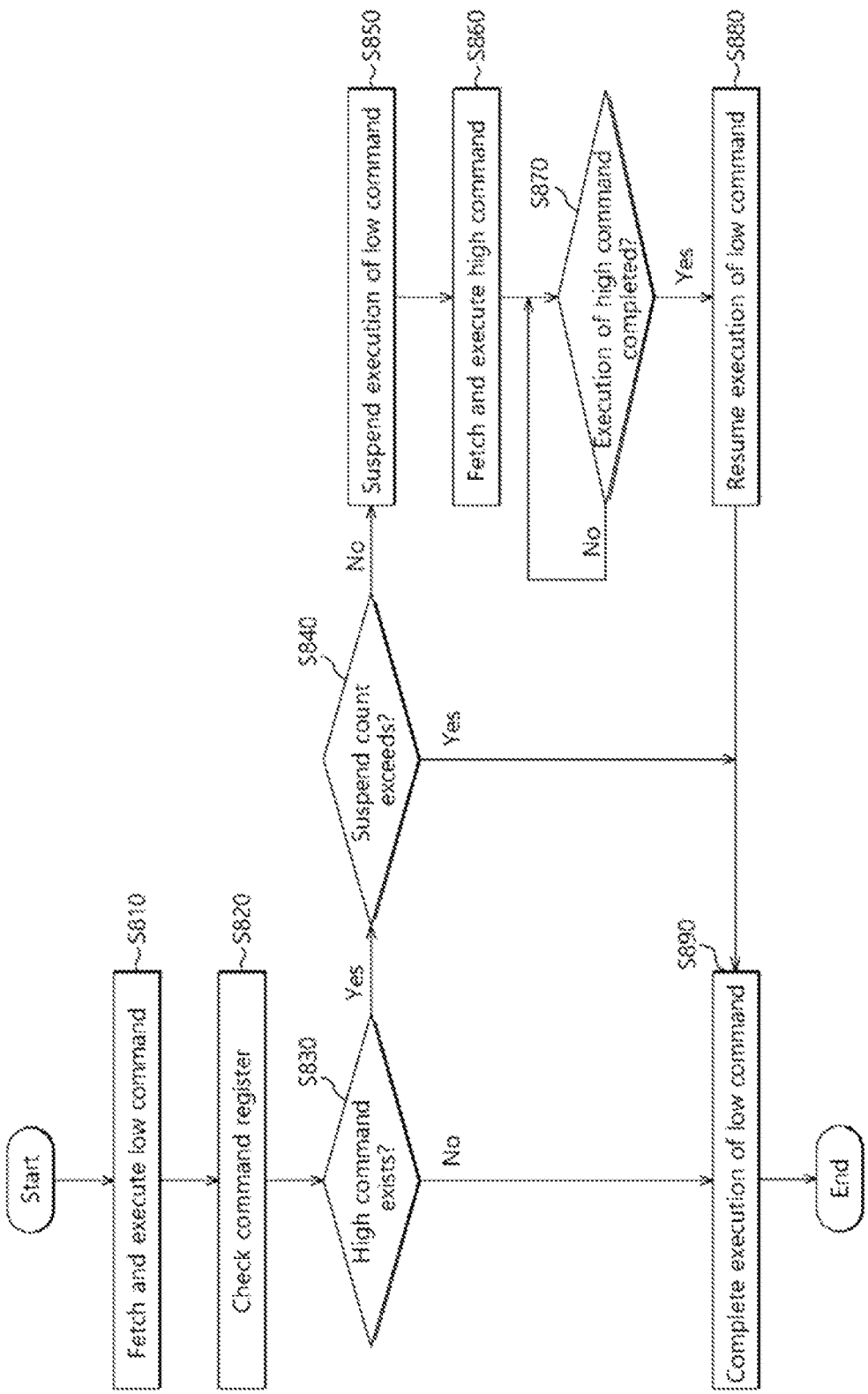
FIG. 8 is a flow chart of a method for performing a suspending operation of a memory device, in accordance with another embodiment of the present invention.

FIG. 8 is a flow chart of a method for performing the suspend operation of the memory device 100 according to an embodiment of the present invention. It is assumed that a low command is stored in the first command register 130 of the memory device 100.

At step S810, the control logic 120 of the memory device 100 may fetch the low command from the first command register 130, and execute the fetched low command.

At step S820, the control logic 120 may check the other command register, i.e., the second command register 140.[ipntlaw10]

At step S830, the control logic 120 may determine whether a high command is stored in the second command register 140.

When the second command register 140 is determined to store the high command at step S830, the control logic 120 may determine whether the suspend count of the low command currently in the process of being executed exceeds a predetermined suspend count PSC at step S840.

When the suspend count of the low command currently in the process of being executed is determined as equal to or smaller than the predetermined suspend count PSC, the control logic 120 may suspend operation to the low command currently in the process of being executed. At this time, the control logic 120 may back up a register value necessary for execution of the low command and data.

At step S860, the control logic 120 may fetch the high command from the second command register 140, and execute the fetched high command.

At step S870, the control logic 120 may determine whether execution of the high command is completed. As a result of the determination, if execution of the high command is completed, step S880 may be performed.

At the step S880, the control logic 120 may resume execution of the low command currently suspended, and the control logic 120 may complete execution of the low command at the step S890.

When the second command register 140 is determined, not to store the high command at step S830 or the suspend count of the low command currently in the process of being executed is not determined as equal to or smaller than the predetermined suspend count PSC at step S840, the control logic 120 may complete execution of the low command at the step S890.

Figure 9:
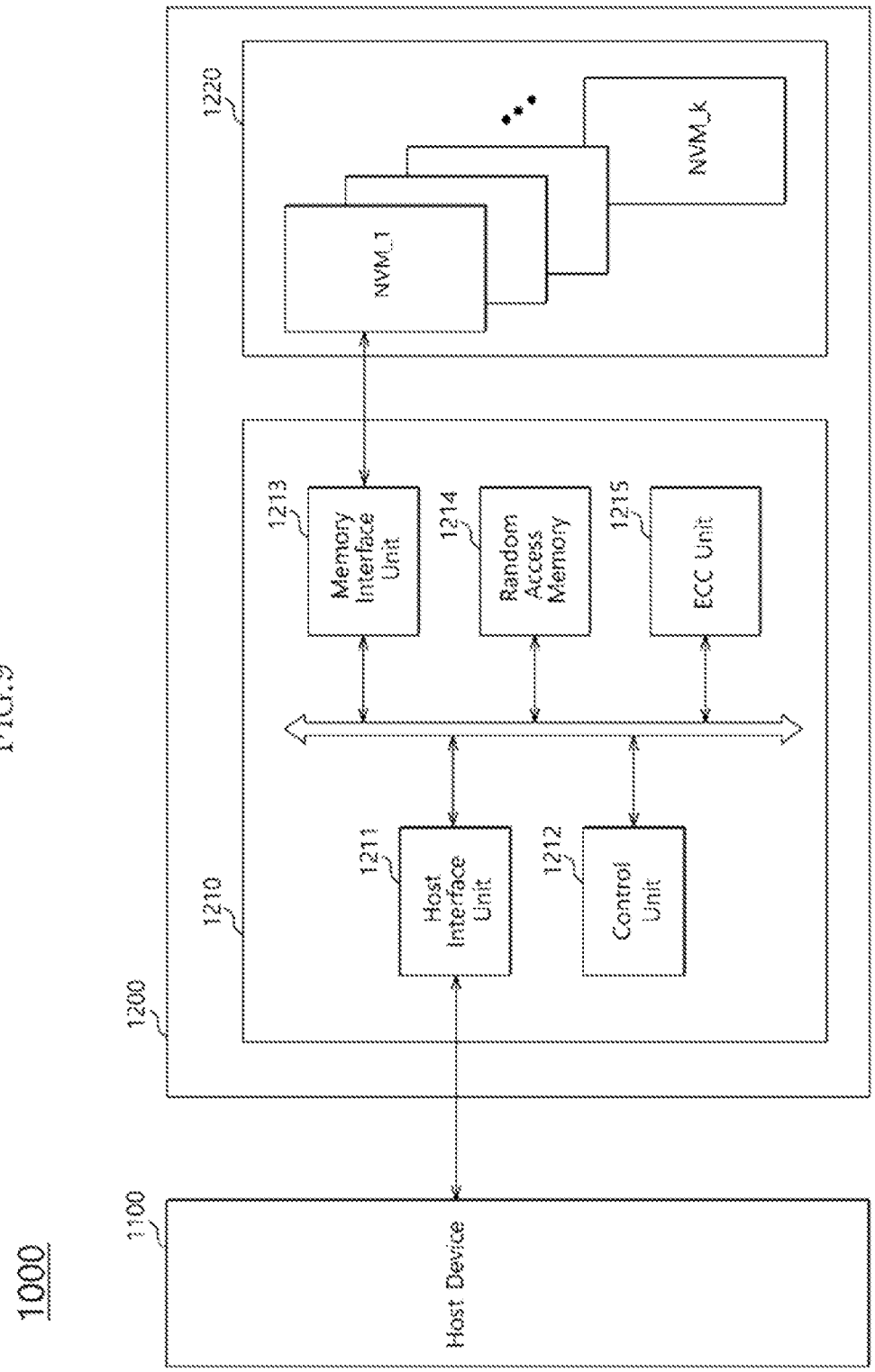
FIG. 9 is a block diagram illustrating a data processing system including a memory system, in accordance with an embodiment of the present invention.

FIG. 9 is a block diagram illustrating a data processing system 1000 including a memory system 1200 in accordance with an embodiment of the present invention.

Referring to FIG. 9, the data processing system 1000 may also include a host device 1100 operatively coupled to the memory system 1200.

The memory system 1200 may include a controller 1210 and a nonvolatile memory device 1220. The memory system 1200 may be used by being coupled to the host device 1100 such as a mobile phone, an MP3 player, a laptop computer, a desktop computer, a game player, a TV, an in-vehicle infotainment system, and so forth.

The nonvolatile memory device 1220 may configured according to the memory device of FIG. 1 or 4 and may include two command registers (see FIG. 1) which store commands transmitted from the controller 1210, and a command state register (see FIG. 1) which stores respective state informations of the commands stored in the respective command registers.

The controller 1210 may include a host interface unit 1211, a control unit 1212, a memory interface unit 1213, a random access memory 1214, and an error correction code (ECC) unit 1215.

The random access memory 1214 may be used as the working memory of the control unit 1212. The random access memory 1214 may be used as a buffer memory which temporarily stores data read out from the nonvolatile memory device 1220 or data provided from the host device 1100.

The control unit 1212 may control one or more operations of the controller 1210 in response to a request from the host device 1100. The control unit 1212 may drive a firmware or a software for controlling the nonvolatile memory device 1220.

The control unit 1212 may determine whether an empty command register exists between the two command registers, by checking the command state register of the nonvolatile memory device 1220, may transmit a command to execute next, to the nonvolatile memory device 1220 when an empty command register exists, and may not transmit a command to the nonvolatile memory device 1220 when an empty command register does not exist.

The host interface unit 1211 may interface the host device 1100 and the controller 1210. For example, the host interface unit. 1211 may communicate with the host device 1100 through one of various interface protocols such as a universal serial bus (USB) protocol, a universal flash storage (UFS) protocol, a multimedia card (MMC) protocol, peripheral component interconnection (PCI) protocol, a PCI express (PCI-E) protocol, a parallel advanced technology attachment (PATA) protocol, a serial advanced technology attachment (SATA) protocol, a small computer system interface (SCSI) protocol, and a serial attached SCSI (SAS) protocol.

The memory interface unit 1213 may interface the controller 1210 and the nonvolatile memory device 1220. The memory interface unit 1213 may provide a command and an address to the nonvolatile memory device 1220. Furthermore, the memory interface unit 1213 may exchange data with the nonvolatile memory device 1220.

The error correction code (ECC) unit 1215 may ECC encode data to be stored in the nonvolatile memory device 1220. Also, the error correction code (ECC) unit 1215 may ECC-decode data read out from the nonvolatile memory device 1220. Moreover, the error correction code (ECC) unit 1215 may count the number of error bits corrected in the process of ECC-decoding data, and calculate the total number of corrected error bits. The error correction code (ECC) unit 1215 may be included in the memory interface unit 1213.

The controller 1210 and the nonvolatile memory device 1220 may be manufactured as any one of various data storage devices. For example, the controller 1210 and the nonvolatile memory device 1220 may be integrated into one semiconductor device and may be manufactured as any one of a multimedia card in the form of an MMC, an eMMC, an RS-MMC and a micro-MMC, a secure digital card in the form of an SD, a mini-SD and an micro-SD, a universal serial bus (USB) storage device, a universal flash storage (UFS) device, a Personal Computer Memory Card International Association (PCMCIA) card, a compact flash (CF) card, a smart media card, a memory stick, and so forth.

Figure 10:
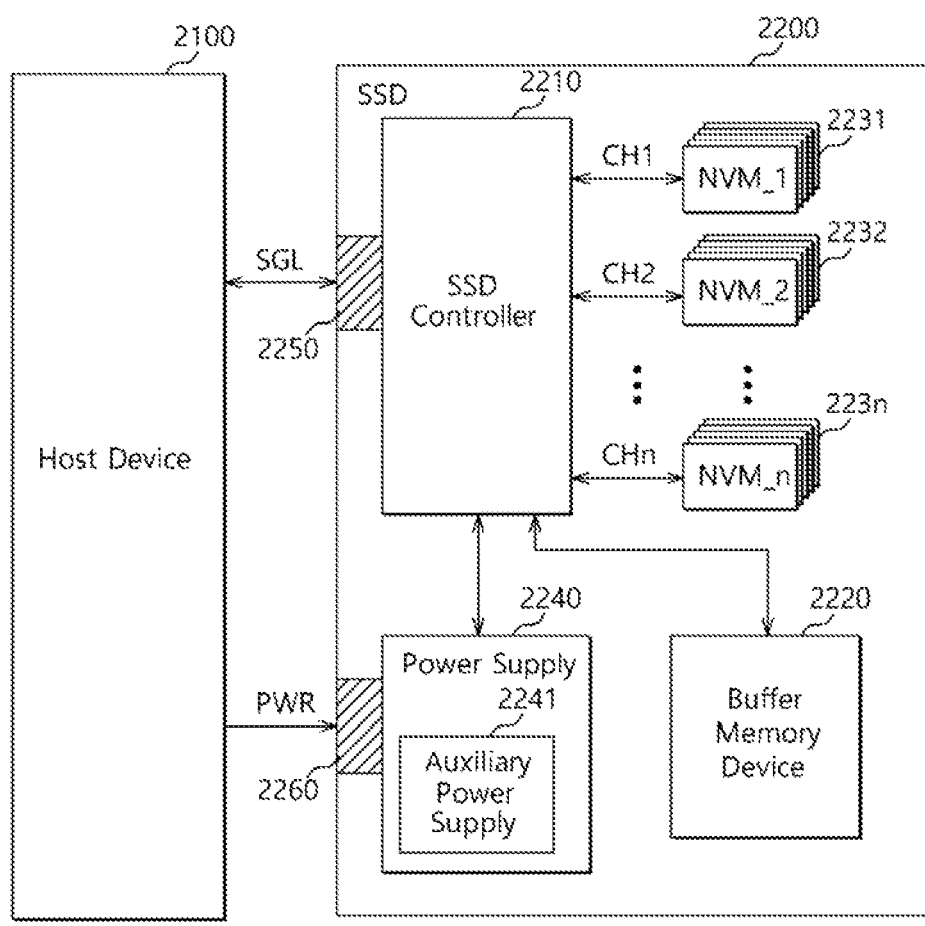
FIG. 10 is a block diagram illustrating a data processing system including a solid state drive (SSD), in accordance with an embodiment of the present invention.

FIG. 10 is a block diagram illustrating a data processing system 2000 including a solid state drive (SSD) 2200 in accordance with an embodiment of the present invention.

Referring to FIG. 10, the data processing system 2000 may) 5 also include a host device 2100 operatively coupled to the solid state drive SSD) 2200.

The SSD 2200 may include an SSD controller 2210, a buffer memory device 2220, nonvolatile memory devices 2231 to 223n, a power supply 2240, a signal connector 2250, and a power connector 2260.

The SSD controller 2210 may access the nonvolatile memory devices 2231 to 223n in response to a request from the host device 2100.

The buffer memory device 2220 may temporarily store data to be stored in the nonvolatile memory devices 2231 to 223n. Further, the buffer memory device 2220 may temporarily store data read out from the nonvolatile memory devices 2231 to 223n. The data temporarily stored in the buffer memory device 2220 may be transmitted to the host device 2100 or the nonvolatile memory devices 2231 to 223n under control of the SSD controller 2210.

The nonvolatile memory devices 2231 to 223n may be used as storage media of the SSD 2200. The nonvolatile memory devices 2231 to 223n may be coupled with the SSD controller 2210 through a plurality of channels CH1 to CHn, respectively. One or more nonvolatile memory devices may be coupled to one channel. The nonvolatile memory devices coupled to each channel may be coupled to the same signal bus and data bus.

Each of the nonvolatile memory devices 2231 to 223n may be configured according to the memory device of FIG. 1 or 4 and may include two command registers (see FIG. 1) which store commands transmitted from the SSD controller 2210, and a command state register (see FIG. 1) which stores respective state informations of the commands stored in the respective command registers.

The power supply 2240 may provide power PWR inputted through the power connector 2260, to the inside of the SSD 2200. The power supply 2240 may include an auxiliary power supply 2241. The auxiliary power supply 2241 may supply power to allow the SSD 2200 to be normally terminated when a sudden power-off occurs. The auxiliary power supply 2241 may include large capacitance capacitors capable of charging power PWR.

The SSD controller 2210 may exchange a signal SGL with the host device 2100 through the signal connector 2250. The signal SGL may include a command, an address, data, and so forth. The signal connector 2250 may be configured by a connector such as of parallel advanced technology attachment (DATA), serial advanced technology attachment (SATA), small computer system interface (SCSI), serial attached SCSI (SAS), peripheral component interconnection (PCI) and PCI express (PCI-E) protocols, according to an interface scheme between the host device 2100 and the SSD 2200.

Figure 11:
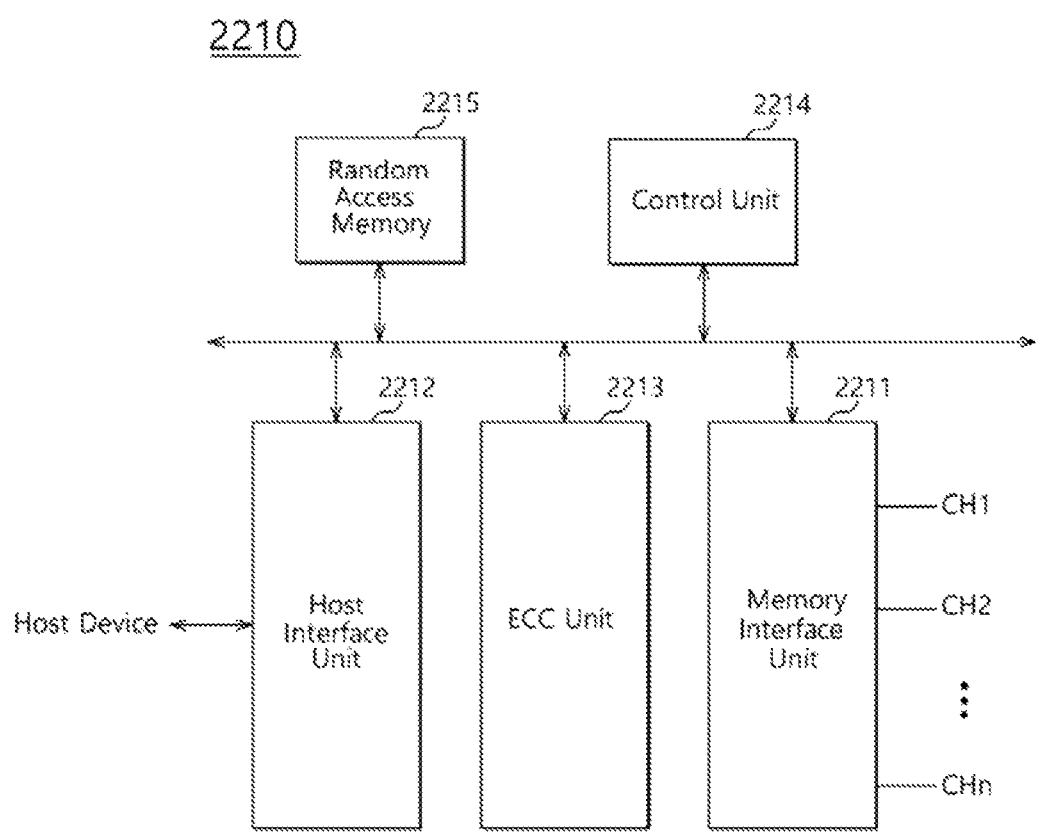
FIG. 11 is a block diagram illustrating the SSD controller of the SSD of FIG. 10.

FIG. 11 is a block diagram illustrating the SSD controller of FIG. 10.

Referring to FIG. 11 the SSD controller 2210 may include a memory interface unit 2211, a host interface unit 2212, an error correction code (ECC) unit 2213, a control unit 2214, and a random access memory 2215 operatively coupled via at least one internal bus.

The memory interface unit 2211 may provide control signals such as commands and addresses to the nonvolatile memory devices 2231 to 223n. Moreover, the memory interface unit 2211 may exchange data with the nonvolatile memory devices 2231 to 223n. The memory interface unit 2211 may scatter data transferred from the buffer memory device 2220 to the respective channels CH1 to CHn, under control of the control unit 2214. Furthermore, the memory interface unit 2211 may transfer data read out from the nonvolatile memory devices 2231 to 223n to the buffer memory device 2220, under control of the control unit 2214.

The host interface unit 2212 may provide interfacing with respect to the SSD 2200 in correspondence to the protocol of the host device 2100. For example, the host interface unit 2212 may communicate with the host device 2100 through any one of the parallel advanced technology attachment (PATA) protocol the serial advanced technology attachment (SATA) protocol, the small computer system interface (SCSI) protocol, the serial attached SCSI (SAS) protocol, the peripheral component interconnection (PCI) protocol and the PCI express (PCI-E) protocol.

In addition, the host interface unit 2212 may perform a disk emulating function of supporting the host device 2100 to recognize the SSD 2200 as a hard disk drive (HDD).

The control unit 2214 may analyze and process the signal SGL inputted from the host device 2100. The control unit 2214 may control operations of the buffer memory device 2220 and the nonvolatile memory devices 2231 to 223n according to a firmware or a software for driving the SSD 2200.

The random access memory 2215 may be used as the working memory of the control unit 2214.

The control unit 2214 may analyze and process the signal SGL inputted from the host device 2100. The control unit 2214 may control operations of the buffer memory device 2220 and the nonvolatile memory devices 2231 to 223n according to a firmware or a software for driving the SSD 2200.

The control unit 2214 may determine whether an empty command register exists, by checking the command state register of each of the nonvolatile memory devices 2231 to 223n, may transmit a command to execute next, to each of the nonvolatile memory devices 2231 to 223n when an empty command register exists, and may not transmit a command to each of the nonvolatile memory devices 2231 to 223n when an empty command register does not exist.

The error correction code (ECC) unit 2213 may generate parity data to be transmitted to the nonvolatile memory devices 2231 to 223n, among data stored in the buffer memory device 2220. The generated parity data may be stored, along with data, in the nonvolatile memory devices 2231 to 223n. The error correction code (ECC) unit 2231 may detect an error of the data read out from the nonvolatile memory devices 2231 to 223n. When the detected error is within a correction capability range, the error correction code (ECC) unit 2213 may correct the detected error. Moreover, the error correction code (ECC) unit 2213 may count the number of corrected error bits, and calculate the total number of corrected error bits.

While various embodiments have been described above, it will be understood to those skilled in the art that the embodiments described are examples only. Accordingly, the memory system and the operating method thereof described herein should not be limited based on the described embodiments. Many other embodiments and variations thereof may be envisaged by those skilled in the art to which the present invention pertains without departing from the scope and spirit of the present invention as defined in the following claims.

What is claimed is:

1. A memory system for storing data accessed by a host device comprising:
    a memory device including a memory cell array, a plurality of command registers configured to store a plurality of commands related to an operation performed in the memory cell array and a command state register configured to store execution state information for each of the plurality of commands stored in the plurality of the command registers; and
    a memory controller external to the memory device and configured to determine whether an empty command register exists among the plurality of command registers based on the execution state information stored in the command state register of the memory device, and transmit a new command to the memory device when an empty command register exists even while the memory device is in a busy state executing a command,
    wherein, when the new command is received from the memory controller, the memory device stores the new command in the empty command register.

2. The memory system according to claim 1, wherein the execution state information represents that the command of the respective command registers is execution-pending, currently being executed, or execution-completed.

3. The memory system according to claim 2, wherein the execution state information of the command stored in the respective command registers is updated according to current execution status of the command, and
    wherein when the command becomes execution-completed, a corresponding one storing the execution-completed command among the command registers becomes empty.

4. The memory system according to claim 2, wherein the memory controller determines that there is the empty command register among the plurality of the command registers when the execution state information for a command stored in at least one command register among the plurality of the command registers is the execution-completed.

5. A memory system for storing data accessed by a host device comprising:
    a memory device including a memory cell array; and
    a memory controller external to the memory device and configured to transmit a plurality of commands related to an operation performed in the memory cell array,
    wherein the memory device comprises:
    plural command registers configured to store the plurality of commands received from the memory controller;
    a command state register configured to store execution state information of each of the plurality of the commands stored in the command registers, and
    a control logic configured to store the plurality of the commands received from the memory controller in an empty command register of the command registers,
    wherein the memory controller determines by checking the execution state information stored in the command state register whether the empty command register exists among the command registers and transmits a new command to the memory device when the empty command register exists even while the memory device is in a busy state executing a command, and
    wherein the control logic of the memory device stores the new command received from the memory controller in the empty command register.

6. The memory system according to claim 5, wherein the control logic suspends a lower priority command currently in process of being executed and executes a higher priority command when the memory controller transmits the higher priority command to the memory device.

7. The memory system according to claim 6, wherein the memory device further comprises a suspend condition register configured to store a register value representing a condition for suspending a command currently in process of being executed.

8. The memory system according to claim 7, wherein the control logic suspends the command currently in process of being executed according to the register value of the suspend condition register.

9. The memory system according to claim 6, wherein the control logic suspends the command currently in process of being executed when a suspend count of the command in the process of being executed is equal to or smaller than a predetermined suspend count.

10. The memory system according to claim 5, wherein the execution state information represents that the command of the respective command registers is execution-pending, currently being executed, or execution-completed.

11. The memory system according to claim 10, wherein the command state register further stores execution result information represents that the command of the respective command registers is a pass or a fail.

12. The memory system according to claim 5, wherein the memory device further comprises plural page buffers respectively corresponding to the command registers, and each configured to buffer data including a command stored in a corresponding command register.

13. A method for operating a memory system for storing data accessed by a host device including a memory device, which includes a memory cell array, a plurality of command registers and a command state register configured to store execution state information of each of the plurality of the commands stored in the command registers, and a memory controller external to the memory device, which transmits a plurality of commands related to an operation performed in the memory cell array, the method comprising:
determining, by the memory controller, whether an empty command register exists among the plurality of command registers based on the execution state information stored in the command state register of the memory device;
transmitting, by the memory controller, a new command to the memory device when an empty command register exists even while the memory device is in a busy state executing a command; and
storing, by the memory device, the received command in the empty command register.

14. The method according to claim 13, wherein the determining of whether an empty command register exists includes determining whether a command, execution of which is completed, exists by checking the execution state information for each of the plurality of the commands stored in the plurality of command registers.

15. The method according to claim 13, further comprising:
fetching and executing the commands stored in the plurality of command registers in a sequence in which they are received;
determining whether a command of higher priority than a command currently in process of being executed is received;
suspending the command currently in process of being executed when the command of higher priority is transmitted, and executing the command of higher priority; and
resuming the suspended command when execution of the command of higher priority is completed.

16. The method according to claim 15, wherein the suspending the command currently in process of being executed includes:
comparing a suspend count of the command currently in process of being executed and a predetermined suspend count; and
suspending the command currently in process of being executed when the suspend count of the command currently in process of being executed is equal to or smaller than the predetermined suspend count.

17. The method according to claim 15, wherein the suspending of the command currently in process of being executed is performed according to a suspend condition set in advance by the memory controller.

18. The method according to claim 13, further comprising:
fetching and executing the commands stored in the plurality of command registers in a sequence in which they are transmitted;
determining whether a command of higher priority than a command currently in process of being executed exists by checking the plurality of command registers;
suspending the command currently in process of being executed when the command of higher priority exists, and executing the command of higher priority; and
resuming the suspended command when execution of the command of higher priority is completed.

19. The method according to claim 18, wherein the suspending of the command currently in process of being executed includes:
comparing a suspend count of the command currently in process of being executed and a predetermined suspend count; and
suspending the command currently in process of being executed when the suspend count of the command currently in process of being executed is equal to or smaller than the predetermined suspend count.

* * * * *